United States Patent
Chang et al.

(10) Patent No.: US 8,341,450 B2
(45) Date of Patent: Dec. 25, 2012

(54) CONTINUOUS TIMING CALIBRATED MEMORY INTERFACE

(75) Inventors: Kun-Yung Chang, Los Altos, CA (US); Fariborz Assaderaghi, Los Altos, CA (US); Hae-Chang Lee, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 1198 days.

(21) Appl. No.: 12/137,935

(22) Filed: Jun. 12, 2008

(65) Prior Publication Data

US 2009/0031091 A1   Jan. 29, 2009

Related U.S. Application Data

(60) Provisional application No. 60/951,295, filed on Jul. 23, 2007.

(51) Int. Cl.
*G06F 13/42* (2006.01)

(52) U.S. Cl. ............................ 713/400; 702/89; 711/167

(58) Field of Classification Search ............. 365/189.14; 702/89; 711/167; 713/400
See application file for complete search history.

(56) References Cited

U.S. PATENT DOCUMENTS

| | | | |
|---|---|---|---|
| 6,961,862 B2 * | 11/2005 | Best et al. ................. | 713/401 |
| 7,095,789 B2 | 8/2006 | Ware et al. | |
| 7,400,670 B2 | 7/2008 | Hampel et al. | |
| 7,400,671 B2 | 7/2008 | Hampel et al. | |
| 7,415,073 B2 | 8/2008 | Ware et al. | |
| 7,948,812 B2 * | 5/2011 | Ware ..................... | 365/189.15 |
| 2005/0265437 A1 * | 12/2005 | Yeung et al. .............. | 375/224 |
| 2008/0056415 A1 | 3/2008 | Chang et al. | |

* cited by examiner

*Primary Examiner* — Albert Wang
(74) *Attorney, Agent, or Firm* — Mahamedi Paradice Kreisman LLP; Lance M. Kreisman (57) ABSTRACT

A system that adjusts the timing of write operations at a memory controller is described. This system operates by observing timing drift for read data at the memory controller, and then adjusting the timing of write operations at the memory controller based on the observed timing drift for the read data.

32 Claims, 5 Drawing Sheets

CONTINUOUS TIMING CALIBRATED MEMORY INTERFACE

RELATED APPLICATIONS

This application hereby claims priority under 35 U.S.C. §119 to U.S. Provisional Patent Application No. 60/951,295, filed on 23 Jul. 2007, entitled "CONTINUOUS TIMING CALIBRATED MEMORY INTERFACE", by inventor(s) Kun-Yung Chang et al. The present application hereby incorporates by reference the above-referenced provisional patent application.

TECHNICAL FIELD

The present embodiments relate to memory interfaces. More specifically, the present embodiments relate to a method and an apparatus for efficiently performing continuous timing calibration in a memory interface.

BACKGROUND

As data transfer rates to and from memory become progressively faster, it is becoming increasingly hard to synchronize the timing of the associated data transfers. To optimize system performance, it is desirable to be able to periodically calibrate the timing of the clock signals associated with read and write operations. The purpose of calibration is to compensate for timing variations induced by temperature drift or low-frequency voltage drift during system operation. If timing variations are not compensated, it is possible that the data written to or read from the memory would not be substantially error free.

Existing memory interfaces are typically asymmetric with respect to timing adjustments. For example, in an XDR™ dynamic random access memory (DRAM) interface, the write (read) timing is adjusted at the transmitter (receiver) located on the controller side. In order to correctly adjust the phase position at the controller side, the margin of each pin in the memory interface must be measured. This information is only available at the receiver. One way of obtaining this margin information during a write operation is to send the received bits at the DRAM (which were stored in the memory core) back to the controller through additional read information. This means the write timing adjustment cannot be performed during regular data transmission. Hence, the write timing is typically adjusted by periodically interrupting data transfers to perform calibration operations. Consequently, write buffers of sufficient size are used to store the interrupted data. In addition, flow control from the memory controller is used to schedule the calibration time. Both of these requirements increase the hardware complexity of the memory interface.

Another option is to use the "N+1 technique," in which an additional link (either physical or phantom) is calibrated while the other N links continue to transmit data. However, this technique either increases cost by adding pins and traces for physical links, or reduces the signaling voltage threshold (Vt) margin in the case of phantom links.

Another possible solution is to use clock-and-data-recovery (CDR) circuitry to automatically generate a clock signal at the receiver. This CDR circuitry generates a clock signal with the correct phase and frequency relative to the transitions in the data stream. CDR circuitry can be complex and, hence, it may not be practical to implement such circuitry on each pin of a memory device (where space is at a premium) to facilitate phase alignment during write operations. Note that the process technology for memory devices is highly specialized to create the memory cells. Also, memory devices are normally built on process technologies that do not offer the same level of interconnect metallization as compared to controller devices. Both of these issues make the implementation of complex circuits on memory devices area-inefficient, thereby adding to the cost of memory devices, which are quite cost-sensitive.

Hence, what is needed is a method and an apparatus for efficiently performing timing adjustments for memory operations without adversely impacting the cost of the memory devices used in the system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Embodiments of a system that adjusts the timing of write operations at a memory controller are described. This system operates first by observing and then correcting the timing drift for read data at the memory controller. Then, the same information on the drift is used to infer and correct the timing drift of write operations at the memory controller.

System

Figure 1:
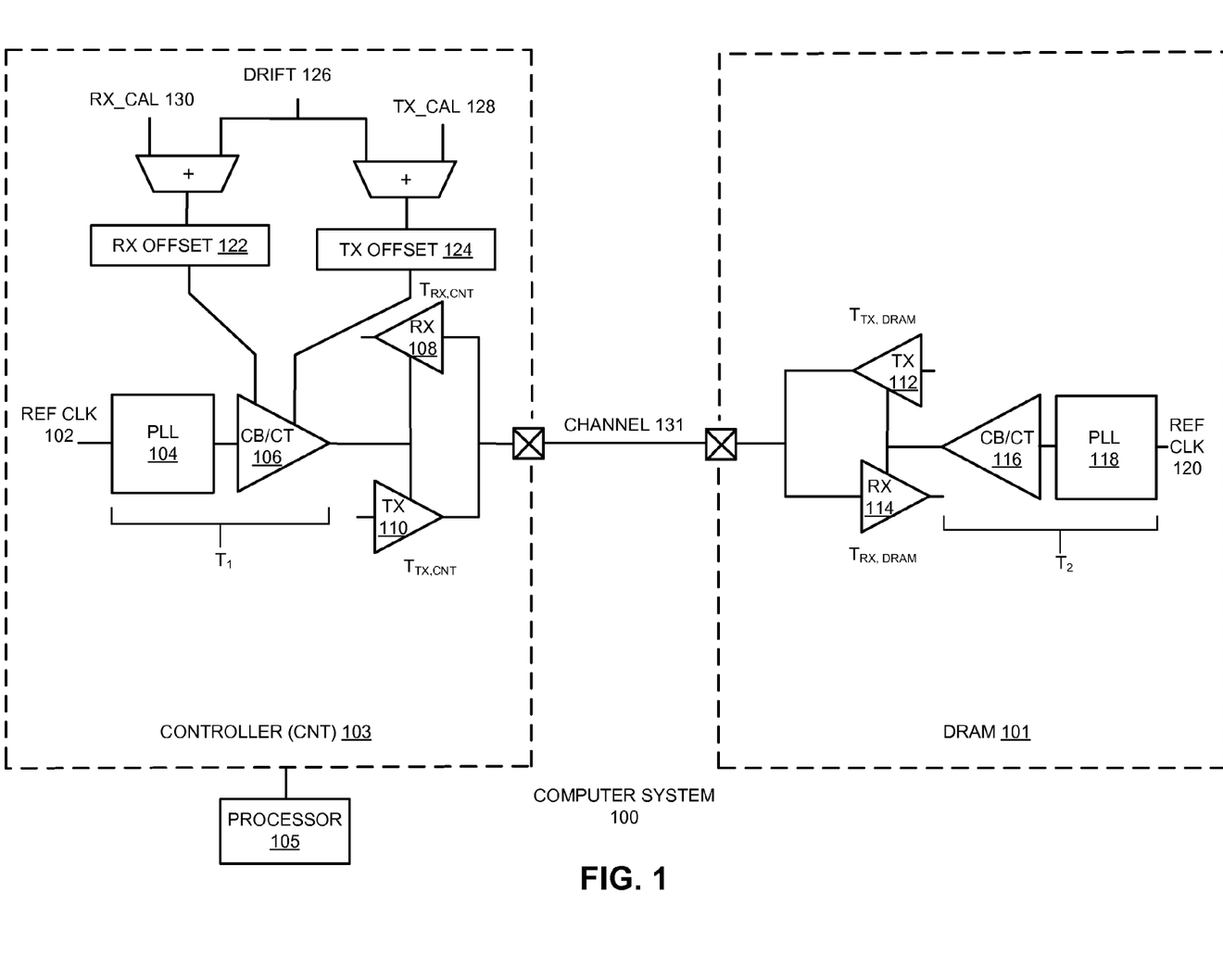
FIG. 1 illustrates a computer system which includes a memory controller coupled to a dynamic random access memory (DRAM).

FIG. 1 illustrates an embodiment of a computer system 100 which implements a timing-adjustment technique. Computer system 100 includes a processor 105, which is coupled to a memory controller (CNT) 103. Memory controller 103 is in turn coupled to dynamic random access memory (DRAM) 101 through channel 131. Note that the timing-adjustment technique described below can generally be applied to any type of system which transmits data bidirectionally or unidirectionally, and is not limited to a computer system as illustrated in FIG. 1.

Channel 131 can generally include any type of communication channel which can be used to transmit data to and from memory. In the illustrated embodiment, channel 131 is a bidirectional channel which is used to transmit write data from controller 103 to DRAM 101 and is also used to transmit read data from DRAM 101 to controller 103. However, the techniques described below can generally be applied to any type of bidirectional or unidirectional communication channel.

DRAM 101 can generally include any type of memory device, such as: a dynamic random access memory (DRAM), a static random access memory (SRAM) and/or an electrically erasable programmable read-only memory (EEPROM), and other types of non-volatile memories such as RAM (PRAM) and magnetoresistive RAM (MRAM). In the illustrated embodiment, DRAM 101 includes a receiver (RX) 114 that receives data from controller 103 during write operations and a transmitter (TX) 112 that transmits data to controller 103 during read operations. (Note that RX 114 has an effective setup time $T_{RX,DRAM}$ and TX 112 has a delay $T_{TX,DRAM}$.) Both RX 114 and TX 112 receive a clock signal from clock buffer/clock tree (CB/CT) 116. The effective receive setup time and transmit delay ($T_{RX,DRAM}$, $T_{TX,DRAM}$) are defined with respect to a reference clock (REF_CLK) 120. The reference clock 120 may be forwarded from another device or generated locally. (Note that the delay through PLL 118 and CB/CT 116 is $T_2$.)

Controller 103 can generally include any type of memory controller that enables a computing system (or computing device) to perform read and write operations involving a memory, such as DRAM 101. As illustrated in FIG. 1, controller 103 includes a receiver (RX) 108 that receives data from DRAM 101 during read operations, and a transmitter (TX) 110 that transmits data to DRAM 101 during write operations. (Note that RX 108 has a setup time $T_{RX,CNT}$ and TX 110 has a delay $T_{TX,CNT}$.) Both RX 108 and TX 110 receive a clock signal from clock buffer and clock tree (CB/CT) 106. This clock signal is produced by a circuit which includes a phase-locked loop (PLL) 104 that generates a clock signal from a reference clock (REF CLK) 102. In one embodiment, reference clock signal 102 may have a frequency of 500 MHz and a primary clock signal generated by the PLL 104 has a frequency of 2.5 GHz. (Note that the delay through PLL 104 and CB/CT 106 is $T_1$.)

The timing of the clock signals received by RX 108 and TX 110 is adjusted by applying an RX timing (or phase) offset 122 to read operations and a TX timing (or phase) offset 124 to write operations. Moreover, note that the RX offset 122 is produced by adding an RX calibration value (RX_CAL) 130 to a drift value 126. Similarly, the TX offset 124 is produced by adding a TX calibration value (TX_CAL) 128 to the same drift value 126. This drift value 126 is determined by observing read data as discussed in more detail below. RX offset 122 and TX offset 124 adjust the timing (or phase) of clocks received by RX 108 and TX 110, effectively advancing or retarding these clocks with respect to the REF CLK 102.

Note that by using the same drift value 126 to adjust both read and write operations, the system assumes that the timing drift for write operations is substantially correlated with the timing drift for read operations. This is a reasonable assumption if the clock generation circuitry for RX 108 and TX 110 share the same PLL and phase mixer, and if the delays through RX 108 and TX 110 are substantially matched. (Note that a phase mixer is a circuit which receives two or more input clock signals and outputs a signal having a phase between the phases of the input signals.)

More specifically, the read drift and the write drift can be calculated as follows:

$$T_{read\_drift} = -\Delta T_1 - \Delta T_{RX,CNT} + \Delta T_{TX,DRAM} + \Delta T_2;$$

and $$T_{write\_drift} = -\Delta T_1 - \Delta T_{TX,CNT} + \Delta T_{RX,DRAM} + \Delta T_2.$$

In the equations above, if $\Delta T_{RX,CNT} \approx \Delta T_{TX,CNT}$ and if $\Delta T_{RX,DRAM} \approx \Delta T_{TX,DRAM}$ then $T_{read\_drift} \approx T_{write\_drift}$.

Moreover, in the equations above, a positive value means the timing is delayed, and a negative value means the timing is advanced. Hence, in the read direction, a phase offset that generates the same delay as $T_{read\_drift}$ needs to be applied to compensate for timing drift during read operations. Moreover, the sign of this phase offset is the same as that of $T_{write\_drift}$.

When the transmit and receive clocks are shared, the error terms are only associated with the matching between the transmitter buffer delays, $T_{TX,CNT}$ and $T_{TX,DRAM}$, and the corresponding the receiver setup times, $T_{RX,CNT}$ and $T_{RX,DRAM}$. Moreover, these error terms usually are much smaller than other drift terms such as those from the phase-frequency detector/charge pump (PFD/CP) of the PLL, and clock buffer matching with the feedback path of the PLL).

If the transmit and receive clocks are generated using the same PLL and phase mixer then the read drift and write drift are likely to be well-correlated. However, even if the transmit and receive clocks are generated using different phase mixers but with the same PLL, the key drift components on the controller side, such as the PFD/CP delay and the clock path delay, are either shared or closely matched between read and write operations.

Also note that it is not necessary for the transmit and receive clocks to be generated as described above for the timing drift in the read data to be used to adjust the timing drift in the write data. The only requirement is that the timing drift of the read data be largely correlated with the timing drift of the write data. This can be true even in systems where the transmit and receive clocks are generated using different PLLs.

On the memory side (at DRAM 101), because there is no clock adjustment, the path sharing and timing match is almost the same as on the controller side. Also, for bidirectional memory links, the channel itself is shared between read and write operations.

In the circuitry illustrated in FIG. 1, the read and write operations have almost identical timing components. Therefore, if a certain clock adjustment is needed in the read direction, the same amount of adjustment can be applied to the write direction. For a phase mixer implementation, this means the same phase offset required to compensate for the drift for the read direction can be used for compensation in the write direction.

Circuitry

Figure 2:
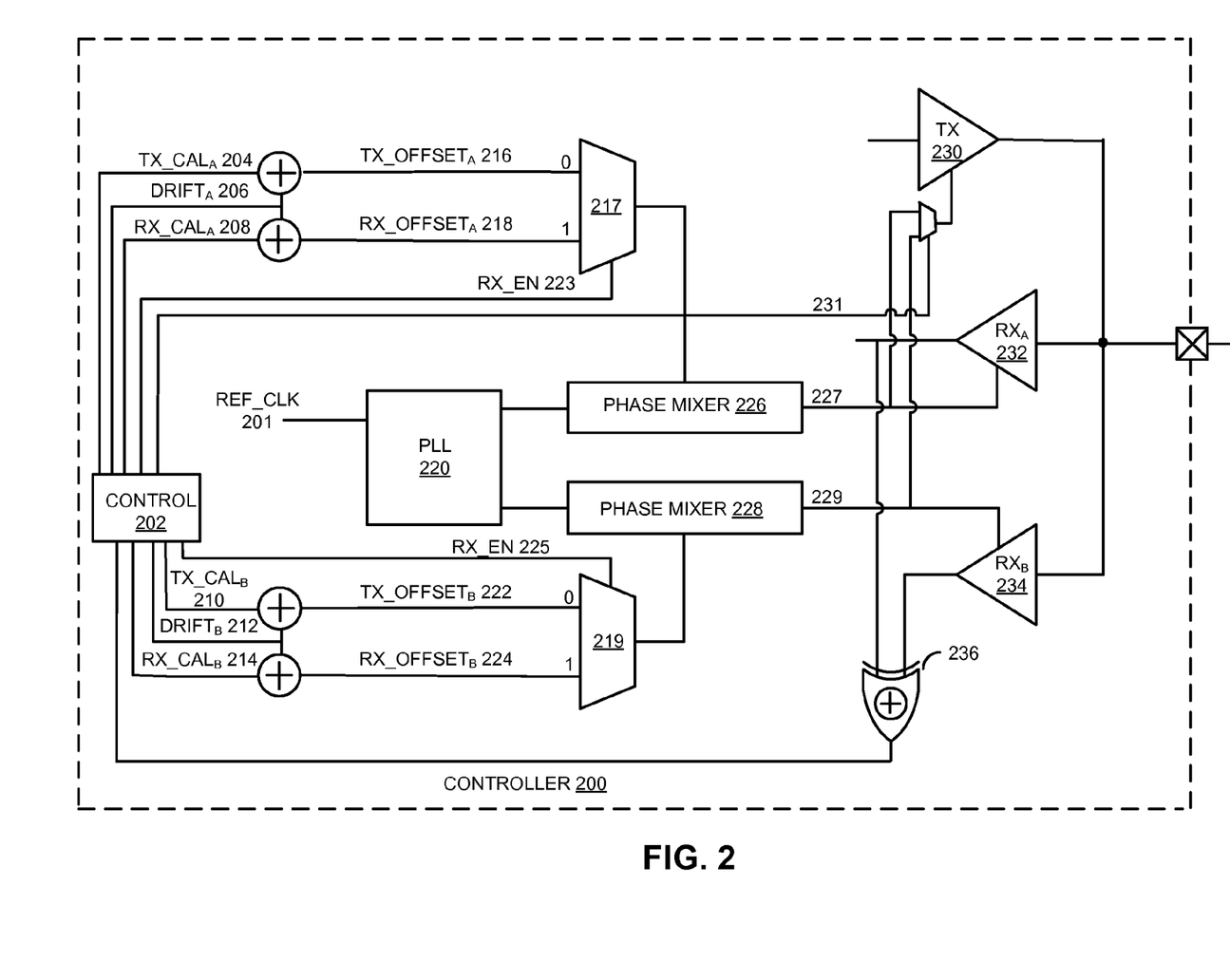
FIG. 2 illustrates circuitry at a memory controller.

FIG. 2 illustrates circuitry within an embodiment of a memory controller 200. In this embodiment, a memory controller 200 includes two receivers, $RX_A$ 232 and $RX_B$ 234, which receive data from a memory (not shown) during read operations and a single transmitter (TX) 230 that transmits data to the memory during write operations. The presence of the two receivers, $RX_A$ 232 and $RX_B$ 234, enables $RX_A$ 232 to be calibrated while $RX_B$ 234 is receiving data, and similarly allows $RX_B$ 234 to be calibrated while $RX_A$ 232 is receiving data. More specifically, the presence of the two receivers allows one of the receivers to be used to determine timing drift while the other receiver is operating, which facilitates compensating for timing drift "on-the-fly," without interrupting communications between the memory controller 200 and the memory.

The circuitry illustrated in FIG. 2 includes a PLL 220, which generates one or more primary clock signals from a reference clock (REF CLK) 201. In doing so, PLL 220 generates primary clock signals which feed into phase mixer 226 which produces a secondary clock signal 227 for $RX_A$ 232.

Primary clock signals from PLL 220 also feed into phase mixer 228 that produces a secondary clock 229 signal for $RX_B$ 234.

Note that the one or more primary clock signals may have different phases and/or frequencies than the reference clock signal 201. In one embodiment, the primary clock signals include a set of phasor signals that are offset in phase from each other by an integer multiple of a predetermined phase difference. For example, the primary clock signals may include eight phasor signals and the predetermined phase difference may be approximately 45 degrees (i.e., approximately one-eighth of 360 degrees).

Phase mixers 226 and 228 generate secondary clock signals 227 and 229, respectively, from one or more of the primary clock signals, for example, by interpolating between two respective phasors. Note that secondary clock signals 227 and 229 may be calibrated during an initialization or start-up procedure. This calibration process adjusts and/or determines a phase of a respective secondary clock signal such that sampling times corresponding to the secondary clock signal are positioned at an optimal point within an eye pattern (such as the eye pattern 500 in FIG. 5) in both the write and read operations. The optimal point is determined based on optimization of a metric such as bit error rate (BER), etc. This process determines initial offset values for each secondary clock signal (TX_CAL 204 210 and RX_CAL 208 214). In one embodiment, these initial offset values are used by corresponding phase mixers 226 and 228 when generating the secondary clock signals 227 and 229.

Note that these clock signals from phase mixers 226 and 228 also feed through a multiplexer (MUX) 231 into TX 230. This enables TX 230 to receive the same clock signal as $RX_A$ 232 or to receive the same clock signal as $RX_B$ 234. This sharing of clock signals facilitates adjusting of the timing of write operations based on the observed timing drift for the read data as described in more detail below.

The data outputs of $RX_A$ 232 and $RX_B$ 234 are compared through some type of circuitry, which is illustrated as an exclusive-OR (XOR) gate 236 in FIG. 2, and results of the comparison feed into a control circuit 202. Note that many different types of circuits can be used to perform this comparison, and the comparison circuitry is not meant to be limited to an XOR gate as illustrated in FIG. 2.

Control circuit 202 determines a drift value, $drift_A$ 206, for $RX_A$ 232. $Drift_A$ 206 is added to an existing transmit calibration value $TX\_CAL_A$ 204 to produce $TX\_OFFSET_A$ 216. $Drift_A$ 206 is also added to an existing receive calibration value $RX\_CAL_A$ 208 to produce $RX\_OFFSET_A$ 218. $TX\_OFFSET_A$ 216 and $RX\_OFFSET_A$ 218 subsequently feed though MUX 217, which selectively outputs either $TX\_OFFSET_A$ 216 or $RX\_OFFSET_A$ 218 to phase mixer 226 based on a control signal RX_EN 223 received from control circuit 202.

Control circuit 202 similarly determines a drift value, $drift_B$ 212, for $RX_B$ 234. $Drift_B$ 212 is added to transmit calibration value $TX\_CAL_B$ 210 to produce $TX\_OFFSET_B$ 222. $Drift_B$ 212 is also added to receive calibration value $RX\_CAL_B$ 214 to produce $RX\_OFFSET_B$ 224. $TX\_OFFSET_B$ 222 and $RX\_OFFSET_B$ 224 feed though MUX 219, which selectively outputs either $TX\_OFFSET_B$ 222 or $RX\_OFFSET_B$ 224 to the phase mixer 228 based on a control signal RX_EX 225 received from control circuit 202.

Note that select signal 231 controls a multiplexer which selects between outputs 227 and 229 of phase mixers 226 and 228, respectively, to select a clock signal for TX 231.

In the above-described circuit, note that the timing drift of a read operation involving one of the receivers, for example receiver $RX_A$ 232, can be determined by varying (shmooing) the timing of the clock signal to $RX_A$ 232 and comparing the output to the output from a known good receiver, such as $RX_B$ 234 which is not currently being adjusted.

Figure 5:
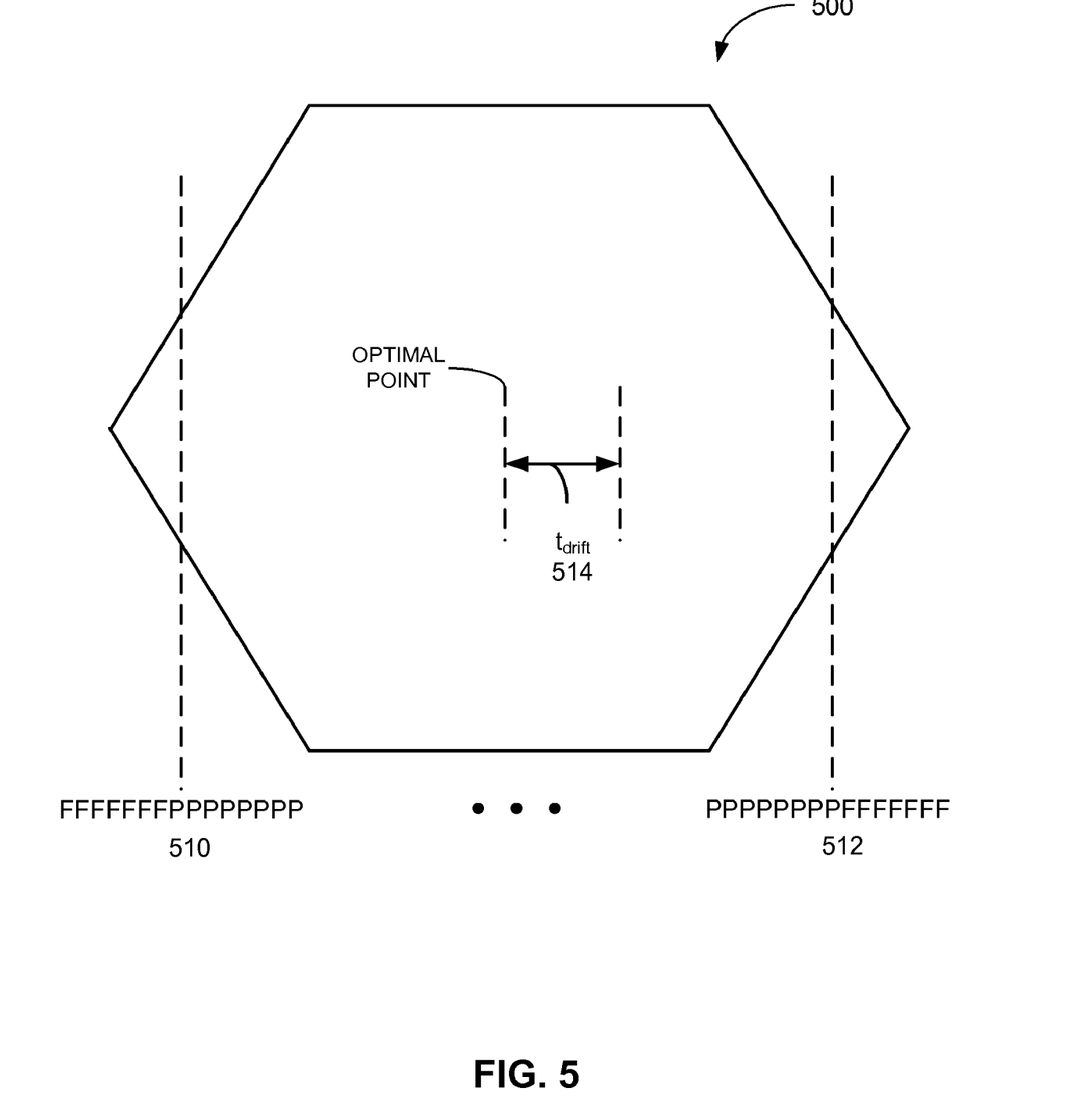
FIG. 5 illustrates an exemplary eye pattern.

This process is illustrated in more detail in FIG. 5, which illustrates an eye diagram or eye pattern 500 associated with a data signal. The eye diagram 500 indicates an acceptable range of timing values that is defined by pass (P) and fail (F) boundaries 510 and 512. A timing drift $t_{drift}$ 514 is shown with respect to the center of the eye diagram 500. In one embodiment of the circuit illustrated in FIG. 2, a secondary clock signal used by a given receiver to receive a data signal is calibrated to be near a center of the eye diagram associated with the data signal. During this process, the phase of the secondary clock signal that is being calibrated may be systematically swept over the corresponding eye pattern, such as the eye pattern 500 in FIG. 5, in order to determine pass-fail boundaries, such as the pass-fail boundaries 510 and 512 in FIG. 5. In this way, sampling times corresponding to the secondary clock signal may be centered in the eye pattern and the channel error margin may be increased and/or maximized. Techniques such as shmooing may be utilized in this process. The definition of a fail in this embodiment is when the outputs of the two receivers $RX_A$ and $RX_B$ do not match (i.e. output of gate 236 is logic 1).

Referring back to FIG. 2, note that $RX_B$ 234 can be used a "reference receiver" while calibrating $RX_A$ 232 to compensate for timing drift, and $RX_A$ 232 can subsequently be used as a reference receiver while calibrating $RX_B$ 234 to compensate for timing drift.

Also note that the same drift value, for example $drift_A$ 206, which is obtained from observing read data, is used to calibrate both read timing and write timing.

The above-described calibration technique attempts to calibrate the clock signal with respect to the center of the data eye. However, in other embodiments the calibration technique attempts to position the clock at a substantially optimum point based on a metric (such as BER minimization), and this optimum point does not necessarily have to be at the center of the data eye. Note that the above-described calibration technique may entail considerable overhead because it essentially doubles the number of phase mixers with a commensurate increase in circuit area and power consumption. In an alternative embodiment, the system includes only a single additional receiver and a single additional phase mixer to calibrate clock signals for a set of N receivers. In this embodiment, the N receivers remain active, while the additional receiver is being calibrated. Once the additional receiver is calibrated, it is swapped with one of the active receivers, which enables the formerly active receiver to be calibrated, and the process continues in a round robin fashion. In this way, the receivers can be calibrated one at a time, and there is no need to double the number of receivers and phase mixers. (Please see U.S. patent application Ser. No. 11/486,517 entitled, "Drift Cancellation Technique for Use in Clock-Forwarding Architectures" by inventors Kun-Yung Chang and Fariborz Assaderaghi.)

Adjusting Timing

Figure 3:
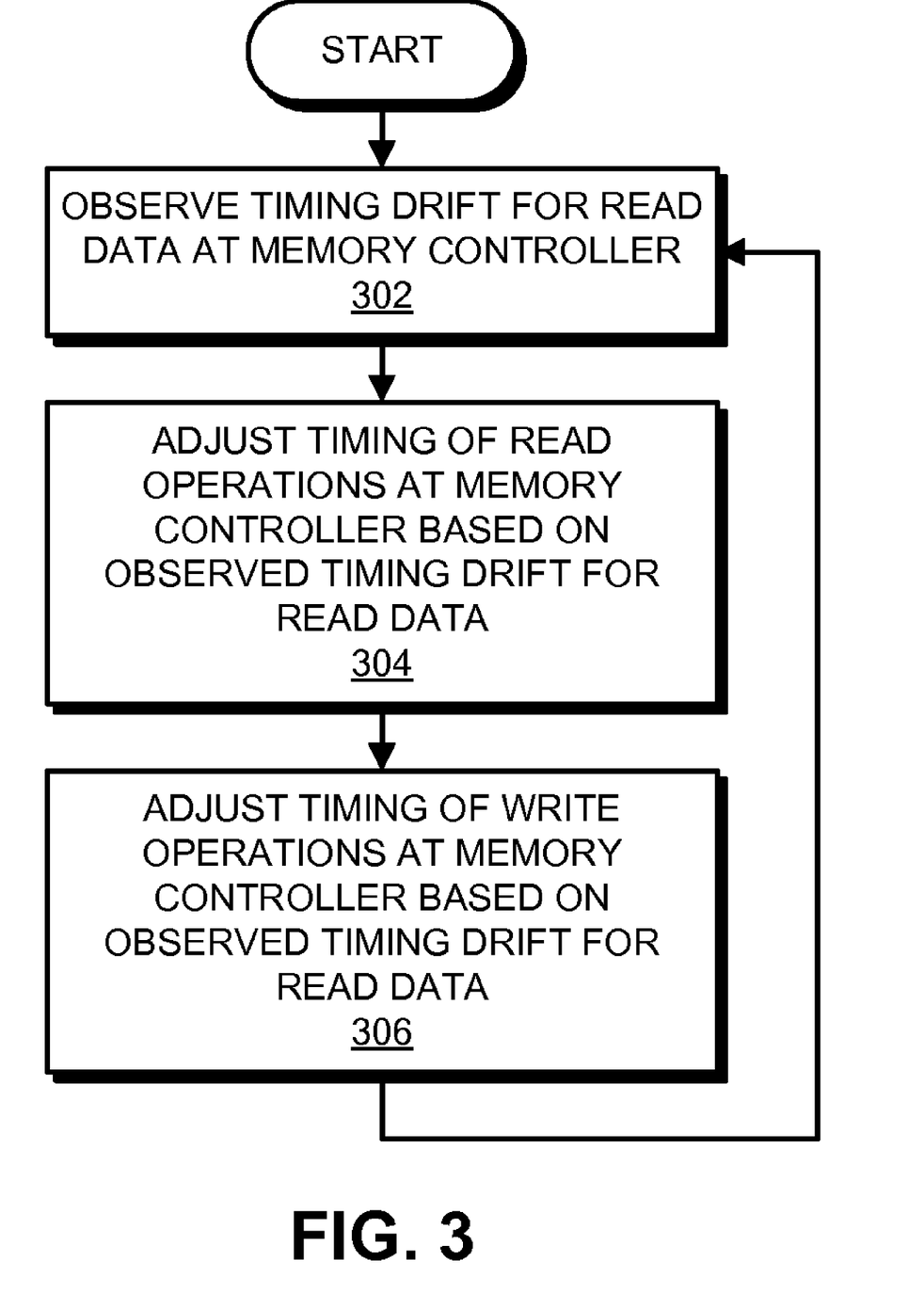
FIG. 3 presents a flow chart illustrating how the timing of write operations can be adjusted based on observed timing drift for read data.

FIG. 3 presents a flow chart illustrating how the timing of write operations can be adjusted based on observed timing drift for read data. During this process, the system first observes timing drift in the read data (302). This process is described in more detail below with reference to FIG. 4. Next, the system can adjust the timing of read operations at the memory controller based on the observed timing drift for the read data (304). This can involve adjusting the timing of a receive clock which is used to receive data from the memory controller during read operations. The system also adjusts the timing of write operations at the memory controller based on the observed timing drift of the read operations (306). This can involve adjusting the timing of a transmit clock which is used to transmit data from the memory controller during write operations. This process is repeated continuously without end. Hence, the calibration process is continuous.

Summary

Hence, this disclosure has described embodiments of a system that adjusts the timing of write operations at a memory controller. This system operates first by observing and then correcting the timing drift for read data at the memory controller. Then, the same information on the drift is used to infer and correct the timing drift of write operations at the memory controller.

In some embodiments, while adjusting the timing of the write operations, the system adjusts the timing of a transmit clock which is used to transmit data from the memory controller during write operations.

In some embodiments, the transmit clock and a receive clock, which is used to receive the read data, are generated using the same phase-locked loop (PLL) on the memory controller.

In some embodiments, the transmit clock and the receive clock are generated using the same phase mixer on the memory controller.

In some embodiments, a transmitter, which transmits data from the memory controller during write operations, and a receiver, which receives data at the memory controller during read operations, are substantially delay-matched.

In some embodiments, while observing the timing drift for the read data, the system captures the read data through a receiver and, while doing so, varies the timing of a clock signal for the receiver. Next, the system performs comparisons between the captured read data and reference read data, which is captured through a reference receiver using a reference clock signal. Then, the system determines the timing drift for the read data based on results of the comparisons.

In some embodiments, observing the timing drift for the read data involves performing a clock-and-data-recovery (CDR) operation on the read data to determine a phase adjustment for the read data, where the phase adjustment indicates the timing drift for the read data.

In some embodiments, while adjusting the timing of the write operations, the system adjusts the timing of the write operations on-the-fly without interrupting communications between the memory controller and a memory.

In some embodiments, the system additionally adjusts the timing of read operations at the memory controller based on the observed timing drift for the read data.

In some embodiments, the system scrambles the read data to provide transition density to observe timing drift in the read data.

In some embodiments, if a read operation does not occur for a specified period of time, the system issues periodic read operations to ensure a minimal balance between read and write operations.

Observing Timing Drift

Figure 4:
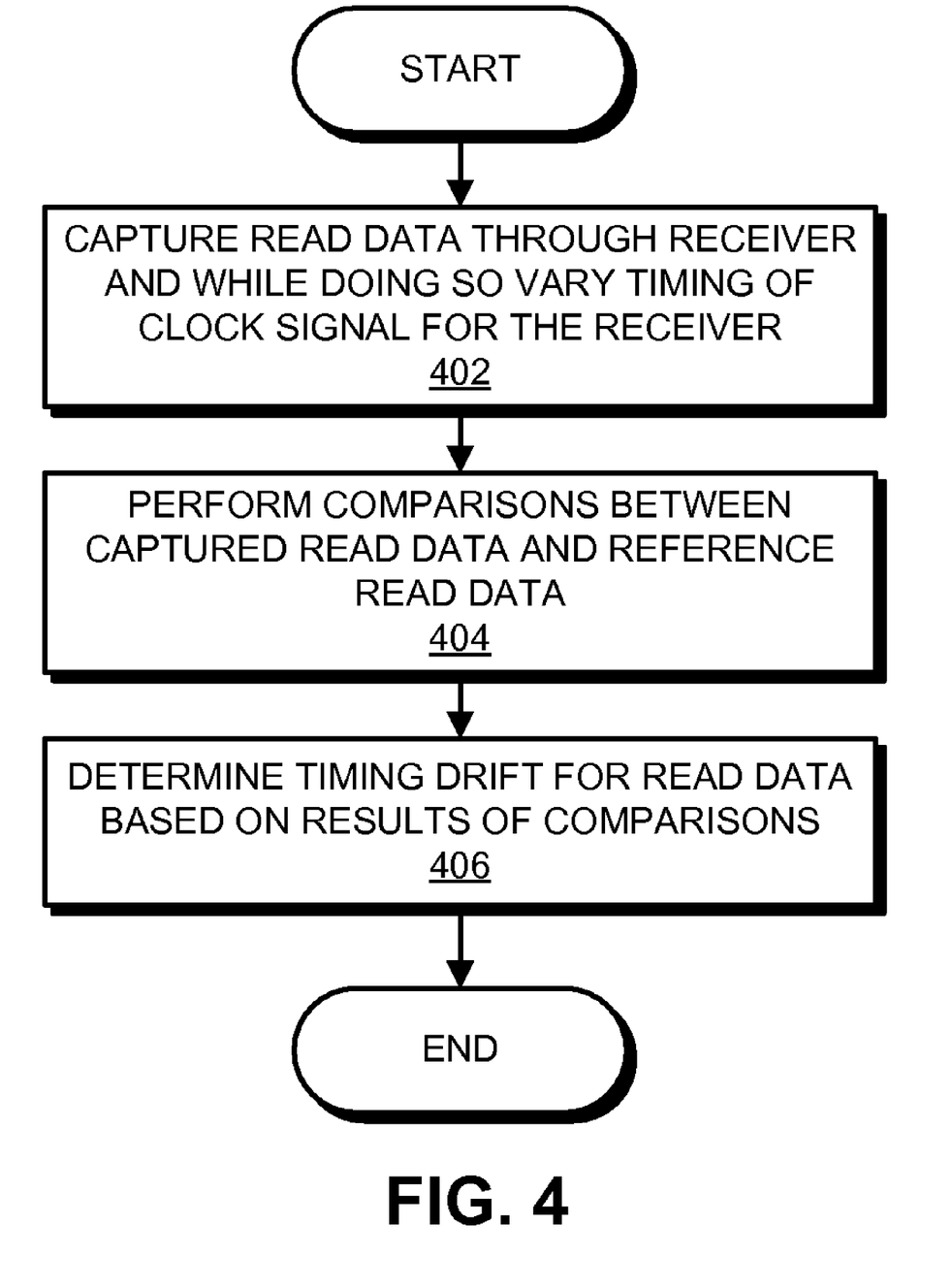
FIG. 4 presents a flow chart illustrating how timing drift for read data is observed.

FIG. 4 presents a flow chart illustrating how timing drift for read data is observed. First, the system captures read data through a receiver and while doing so varies (shmoos) the timing of a clock signal for the receiver (402). During this process, the phase of the receiver clock signal is systematically swept over a corresponding data eye pattern to determine pass-fail boundaries.

Next, the system performs comparisons between the captured read data and the reference read data which is captured through a reference receiver using a reference clock signal (404). This comparison can be performed by a circuit, which can, for example, include exclusive-OR gates. Finally, the system determines the timing drift for the read data based on results of the comparisons (406). As mentioned above, an eye diagram can be used to determine an acceptable range of timing values defined by pass and fail boundaries, wherein a "fail" happens when the captured read data does not match the reference read data.

Note that by adjusting for this timing drift, the sampling time for the receiver clock signal may be optimally placed in the eye pattern and the channel error margin may be increased and/or maximized.

Extensions

Note that the transition density for read operations may be uncertain, and this uncertainty can affect drift measurement (or receive clock centering). Second, the number of read and write operations might not be balanced. (In the limit case, if all the transactions are write operations for a very long time, there will effectively be no drift compensation since no read data drift will be available.) In one embodiment, the first issue (i.e., data transition density during read operations) is mitigated by scrambling the data, for example by XORing the data with the same pseudo-random bit sequence (PRBS), during both write and read operations. In one embodiment, the second issue (i.e., significant write/read imbalance) is mitigated by using a form of flow control. More specifically, if a read operation does not occur for a certain period of time, the controller can interrupt the memory transactions and issue a read operation to facilitate measuring the drift.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method of adjusting timing at a memory controller for write data to be transmitted to a memory device in order to compensate for drift, the method comprising:
   determining a need to update the timing;
   responsively commanding the memory device to transmit data which is stored at the memory device to the memory controller;
   observing drift in the data received by the memory controller from the memory device; and
   adjusting the timing based on the observed drift for the data received at the memory controller.

2. The method of claim 1, further comprising:
   adjusting timing used to sample data at the memory controller based on the observed drift.

3. The method of claim 1, wherein adjusting the timing comprises adjusting the timing of a transmit clock used to transmit the write data from the memory controller to the memory device.

4. The method of claim 3, further comprising:
   generating the transmit clock and a receive clock, the receive clock being used to sample the data from the memory device, using a phase-locked loop (PLL) on the memory controller.

5. The method of claim 3, further comprising:
   generating the transmit clock and a receive clock, the receive clock being used to sample the data from the memory device, using a phase mixer on the memory controller.

6. The method of claim 1, wherein a transmitter used by the memory controller to transmit the write data to the memory device, and a receiver used by the memory controller to sample the data received from the memory device, are substantially delay-matched.

7. The method of claim 1, wherein observing drift comprises:
capturing the data from the memory device at a receiver and concurrently varying the timing of a clock signal for the receiver;
comparing the captured data with reference data.

8. The method of claim 7, wherein the receiver is a first receiver and wherein the reference data is dynamically generated.

9. The method of claim 8, wherein:
the reference data is dynamically generated by capturing the data at a second receiver using a reference clock signal; and
observing the drift is based on results of the comparing.

10. The method of claim 1, wherein observing the drift comprises performing a clock-and-data-recovery (CDR) operation on the data from the memory device to determine a phase adjustment for the data from the memory device, and wherein the phase adjustment indicates the drift.

11. The method of claim 1, wherein adjusting the timing at the memory controller comprises adjusting the timing on-the-fly, without interrupting normal data transmission from the memory controller to the memory device.

12. The method of claim 11, wherein responsively commanding the memory device to transmit the data stored at the memory device to the memory controller comprises commanding the memory device to transmit the data without sending related data to the memory device in response to the need.

13. The method of claim 1, further comprising:
scrambling the data from the memory device to provide transition density to observe timing drift in the data from the memory device.

14. The method of claim 1, wherein:
determining need to update the timing includes monitoring drift in read data received at the memory controller from the memory device, and updating the timing responsive to the drift in the read data; and
responsively commanding the memory device to transmit the data stored at the memory device to the memory controller includes, if a read operation does not occur for a specified period of time, issuing a command to ensure a minimum rate of transfer of stored data from the memory device to the memory controller over a given time.

15. The method of claim 14, wherein issuing a command includes issuing a command for read data previously written to the memory device.

16. A memory controller, comprising:
a transmitter to transmit write data to a memory device;
a receiver to receive data from the memory device; and
a clock-generation circuit operable to generate a transmit clock for the transmitter and a receive clock for the receiver;
wherein the memory controller is operable to determine a need to update the timing and responsively command the memory device to transmit data stored at the memory device to the memory controller, and wherein the clock-generation circuit is operable to observe drift in the data received at the memory controller and responsively adjust the timing.

17. The memory controller of claim 16, wherein the clock-generation circuit is operable to:
adjust timing used to sample the data at the memory controller based on the observed drift.

18. The memory controller of claim 16, wherein the clock-generation circuit is operable to:
adjust the timing of a transmit clock used to transmit the write data from the memory controller to the memory device.

19. The memory controller of claim 18, wherein the transmit clock and a receive clock, the receive clock being used to sample the data from the memory device, are generated using the same phase-locked loop (PLL) in the clock-generation circuit.

20. The memory controller of claim 18, wherein the transmit clock and a receive clock, the receive clock being used to sample the data from the memory device, are generated using the same phase mixer in the clock-generation circuit.

21. The memory controller of claim 16, wherein the transmitter and the receiver are substantially delay-matched.

22. The memory controller of claim 16,
wherein while observing the timing drift for the data from the memory device, the memory controller is operable to:
capture the data from the memory device at the receiver and, while doing so, vary the timing of a receive clock for the receiver; and
compare the captured data with reference data, wherein the reference data is captured at a reference receiver using a reference clock signal.

23. The memory controller of claim 22, wherein the memory controller is operable to determine the drift in the data received at the memory controller based on the comparison.

24. The memory controller of claim 22, wherein the receiver is a first receiver and wherein the reference data is dynamically generated.

25. The memory controller of claim 24, wherein:
the reference data is dynamically generated by capturing the data at a second receiver using a reference clock signal; and
wherein the memory controller is operable to observe the drift based on results of the comparison.

26. The memory controller of claim 16, wherein the clock-generation circuit is operable to:
perform a clock-and-data-recovery (CDR) operation on the data from the memory device to determine a phase adjustment for the read data from the memory device, wherein the phase adjustment indicates the drift.

27. The memory controller of claim 16, wherein the clock-generation circuit is operable to:
adjust the timing at the memory controller on-the-fly, without interrupting normal data transmission from the memory controller to the memory device.

28. The memory controller of claim 16, further comprising a scrambling circuit operable to scramble the data from the memory device to provide transition density to observe the drift.

29. The memory controller of claim 16, further comprising a balancing mechanism operable to:
monitor drift in data received at the memory controller from the memory device, and update the timing responsive to the drift; and
if a read operation does not occur for a specified period of time, issue a command to ensure a minimum rate of transfer of stored data from the memory device to the memory controller over a given time.

30. The memory controller of claim 29, wherein issuing a command includes issuing a command for read data previously written to the memory device.

31. The memory controller of claim 16, wherein the clock generation circuit is operable to command the memory device to transmit the data without sending related data to the memory device.

32. A computer system, comprising:
a processor;
a memory controller coupled to the processor;
a memory device coupled to the memory controller;
a transmitter within the memory controller that transmits write data to the memory device;
a receiver within the memory controller that receives read data from the memory device; and
a clock-generation circuit within the memory controller that generates a transmit clock for the transmitter and a receive clock for the receiver;
wherein the memory controller is operable to determine a need to update the timing; and
responsively command the memory device to transmit data stored at the memory device to the memory controller, and wherein the clock-generation circuit is operable to observe drift in the data received at the memory controller and responsively adjust the timing at the memory controller based on the observed drift.

* * * * *